United States Patent [19]

Weil et al.

[11] 4,240,956
[45] Dec. 23, 1980

[54] TRI(DIBROMONEOPENTYL) ANTIMONITE FLAME RETARDANTS

[75] Inventors: Edward D. Weil, Hasting-on-Hudson; Alfred K. Jung, Ridgewood; Joseph Silberberg, Brooklyn, all of N.Y.

[73] Assignee: Stauffer Chemical Company, Westport, Conn.

[21] Appl. No.: 50,244

[22] Filed: Jun. 20, 1979

[51] Int. Cl.$^3$ .......................... C08K 5/59; C07F 9/90
[52] U.S. Cl. .............................. 260/45.75 B; 260/446
[58] Field of Search .................. 260/446, 45.75 B; 528/93, 124, 285; 424/296

[56] References Cited

U.S. PATENT DOCUMENTS

| | | | |
|---|---|---|---|
| 2,839,554 | 6/1953 | Halsam | 260/466 |
| 3,109,853 | 11/1963 | Worsley et al. | 260/446 |
| 3,245,957 | 4/1966 | Hindersinn et al. | 521/124 |
| 3,372,176 | 3/1968 | Roselli | 260/446 |
| 3,385,819 | 5/1968 | Gouinlock | 260/45.75 B |
| 3,407,153 | 10/1968 | Bowman et al. | 521/124 |
| 3,676,477 | 7/1972 | Chay et al. | 260/446 |
| 3,804,792 | 4/1974 | Pews | 260/31.6 |
| 3,823,175 | 7/1974 | Exner et al. | 260/463 |
| 3,925,303 | 12/1975 | Rio et al. | 260/45.7 P |

OTHER PUBLICATIONS

Journal Indian Chemical Soc'ty., vol. 42, No. 5, (1965), Mehrota et al., pp. 327 to 332.

Primary Examiner—V. P. Hoke
Attorney, Agent, or Firm—Roger S. Benjamin

[57] ABSTRACT

Tri(dibromoneopentyl) antimonite is a solid composition formed by the transesterification of antimony triesters with dibromoneopentylene glycol. This antimonite composition is useful as a flame retardant in plastic formulations.

8 Claims, No Drawings

TRI(DIBROMONEOPENTYL) ANTIMONITE FLAME RETARDANTS

BACKGROUND OF THE INVENTION

It is recognized that compounds containing halogen are among those effective for imparting flame resistance to flammable substrates. In particular, many organic bromine compounds are known agents for compounding flame retardant plastics. Organic bromine compounds are particularly effective in combination with antimony synergists such as antimony oxide. Unfortunately, the separate addition of an antimony containing agent imposes additional measuring, metering, and mixing requirements upon the plastic formulator.

The requirements for a suitable flame retardant extend beyond the sole ability to impart flame resistance. A flame retardant suitable for plastics must be highly compatible with its base material not only under conditions of use but at the stage where the plastic material is being compounded.

The environment of temperature and shear forces present in modern plastic milling equipment render some flame retardant compounds unsuitable because of instability, volatility, or a tendency to remain separate from the base plastics during compounding. The result is often a nonhomogenous product with unacceptable flame retardant characteristics.

It is desirable to develop new flame retardant agents which are effective, stable and easily compounded into plastic base materials processed in conventional equipment.

THE INVENTION

This invention is a novel tri(dibromoneopentyl) antimonite composition. This composition is prepared by the transesterification of antimony triesters with dibromoneopentyl glycol.

Another aspect of this invention are plastic formulations rendered flame retardant by the inclusion of the novel tri(dibromoneopentyl) composition. It is a particular advantage of the novel composition of this invention that its use in a plastic formulation can simultaneously provide both the antimony and the bromine requirements of a flame retardant system.

DETAILED DESCRIPTION OF THE INVENTION

The flame retardant composition of this invention designated, "tri(dibromoneopentyl) antimonite" is a solid having a bromine content of about 47 weight percent, an antimony content of about 24 weight percent and a melting with decomposition range of about 185° C. to about 248° C.

At least a portion of the tri(dibromoneopentyl) antimonite composition is believed to be represented by the formula:

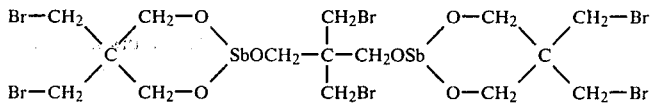

The tri(dibromoneopentyl) antimonite composition which may also be named, tris(dibromoneopentyl) bis-antimonite) is postulated to be a mixture of compounds and related oligomeric structures.

The composition of this invention is synthesized by transesterification of an antimony triester with dibromoneopentyl glycol.

An antimony triester corresponding to the formula:

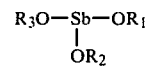

wherein $R_1$, $R_2$, and $R_3$ are independently selected from organic radicals is contacted in a reaction medium with dibromoneopentyl glycol (also designated, 2,2bis (halomethyl) 1,3 propanediol). Suitable antimonite organic radicals are hydrocarbyl radicals such as alkyl, alkaryl, aryl, aralkyl, and cycloalkyl. Preferred antimony triesters are those wherein the $R_1$, $R_2$, $R_3$, $R_4$ are independently selected from alkyl radicals containing one to twenty carbon atoms. Examples of preferred antimony triester reactants are tri-n-butyl antimonite, tri-n-propyl antimonite, and tri-n-amyl antimonite. A mixture of antimony triesters may be used as reactants if desired. The antimony triester reactants may be prepared by conventional techniques such as the reaction of antimony trichloride with an alcohol in the presence of an acid acceptor such as ammonia.

A typical transesterification is illustrated by the following chemical equation:

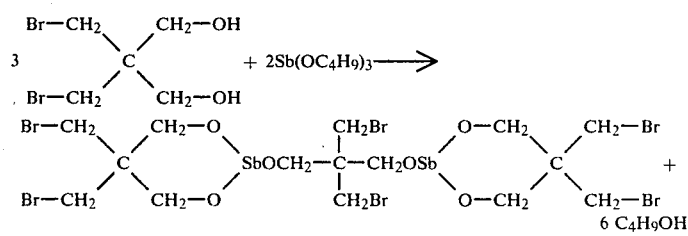

Proportions of reactants for the transesterification are about three moles of the dibromoneopentyl glycol to two moles of the antimony triester. Technical grade dibromoneopentyl glycol containing higher or lower brominated neopentyl glycols is suitable for preparing the compositions of this invention without being deleterious to the transesterification reaction.

Catalyst is not required for the transesterification synthesis but either acid or base catalysts may be employed for assisting the reaction if desired. Examples of acid catalysts are strong inorganic acids such as sulfuric or phosphoric acid. Examples of base catalysts are alkali metal alkoxides such as sodium methoxide. Reaction temperature is not critical excepting that too low temperatures may give impractically slow synthesis and too high temperatures may thermally degrade a portion of the desired product. Generally, useful reaction temperatures are in the range from about 10° C. to 155° C. with temperatures between the limits of 85° C. and 145° C. being preferred.

Time of reaction is not critical and usually covers a range of several minutes to several hours. The transesterification reaction is run at any convenient pressure, usually ambient atmospheric pressure. The reaction medium may be a solution, suspension or slurry. Where one or more of the reactants are liquids, for example, tri-n-butyl antimonite or tri-n-propyl antimonite, the reaction may be run without a solvent or dispersing media. Examples of suitable solvents are chlorinated hydrocarbons such as chloroform or trichloroethane.

Vigorous agitation is an advantageous addition to carrying out the described transesterification method.

Times and temperatures effective to transesterify antimony triesters with dibromoneopentyl glycol can be determined by monitoring the quantity of byproduct alcohol evolved during the synthesis. Because there is an equilibrium of reactants and reaction products in the transesterification it is advantageous to continuously remove the alcohol as formed to encourage formation of the tri(dibromoneopentyl) antimonite product. Byproduct removal is facilitated because the alcohol is often more voltile than the reactants or reaction products. Thermal fractionation, for example, distillation at subatmospheric pressure may be employed during the course of the reaction to facilitate byproduct removal.

The reaction product may optionally be further purified by solvent extraction, volatilization of impurities or other conventional means for removing residual reactants or solvents.

The transesterification may be conducted in any suitable vessel equipped with inlets, outlets, agitation means, and temperature control.

Finally, the tri(dibromoneopentyl) antimonite composition may be milled to any convenient particle size having utility for compounding in a plastic formulation (e.g., 80 mesh to 325 mesh—U.S. Standard Sieve Series).

The novel composition of this invention may be employed to impart flame retardance to a variety of flammable substrates upon which it is impregnated or adhered. Examples of such substrates are cellulosic materials, textiles, fabric backcoatings, foams, and etc. The composition may be applied to substrates by padding, dipping, or spraying as a solution, suspension, emulsion, or melt.

It is a preferred practice of this invention to use tri(dibromoneopentyl) antimonite as a flame retardant for plastic formulations.

Examples of plastics which may be formulated with tri(dibromoneopentyl)antimonite flame retardants are styrenic plastics such as polystyrene, polyamides such as nylon, polyesters such as polyethylene terephthalate, polyolefins such as polypropylene, polyethylene, ethylene-propylene copolymers, polyvinylchloride, and polyacrylates such as polymethacrylate.

Other styrenic plastics useful for formulation with the flame retardant composition of this invention are polystyrene, high impact polystyrene, acrylonitrile-butadiene-styrene resins, styrene-acrylonitrile resins, polyblends of polystyrene and polyphenylene oxide, and acrylate-styrene-acrylonitrile polymers such as described in U.S. Pat. No. 3,944,631.

The tri(dibromoneopentyl) antimonite composition of this invention is added to plastics in flame retardant effective amounts. The effective amount of a flame retardant may readily be determined by formulating plastic compositions with several levels of flame retardant and subjecting these samples to standard tests such as the UL-94 Flammability of Plastic Materials Tests of Underwriters Laboratories, Inc.

Typically the tri(dibromoneopentyl)antimonite is added to the plastic formulation in amounts from about 5 to about 30 weight percent.

It is a preferred practice of this invention to employ the tri(dibromoneopentyl)antimonite as substantially the sole source of bromine and antimony in a flame retardant formulation. Optionally, the flame retardant of this invention may be used in combination with any other known flame retardants, particularly organic bromine compounds having flame retardant utility. Nevertheless, the benefits arising from the practice of this invention generally require that approximately at least one half of the bromine content of a desired flame retardant formulation originate from inclusion of tri(dibromoneopentyl)antimonite composition.

Examples of flame retardants and smoke suppressants which may be included in formulations containing tri(dibromoneopentyl) antimonite are decabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, antimony oxide molybdenum oxide and molybdates, zinc oxide and zinc salts, magnesium oxide and carbonate and alumina trihydrate.

EXAMPLE I

This example illustrates the preparation of tri (dibromoneopentyl) antimonite by the transesterification of an antimony triester with dibromoneopentyl glycol.

Into a 500 ml. resin flask fitted with a stirrer was added 130 grams (0.5 mole) of dibromoneopentyl glycol and 112 grams (0.33 mole) of tri-n-butyl antimonite. The reactants were mixed and heated at 140° C. under vacuum to continuously remove n-butanol byproduct. When the n-butanol evolution ceased, the product remaining in the flask was stripped under high vacuum, yielding a solid having a melting point with decomposition range of 185° C. to 200° C.

EXAMPLE II

This example illustrates the use of tri(dibromoneopentyl) antimonite composition as a flame retardant in plastic compositions.

Part A

High impact polystyrene (REXENE polystyrene) mixed with 13 weight percent tri(dibromoneopentyl) antimonite was fluxed in a Banbury-type mixer at 175° C. at 30 revolutions per minute for 15 minutes. Thereafter, the plastic formulation was removed from the mixer and pressed at 190° C. into 0.3175 cm. thick plaques suitable for preparing test specimens.

Part B

Polypropylene (general purpose—Hercules 6523) mixed with 13 weight percent tri(dibromoneopentyl)

antimonite was fluxed in a 2-roll 15.24 cm. by 33.02 cm. Laboratory Mill (product of Farrell Mfg. Co.).

The mill was operated at a front roll temperature of 193.3° F. at 40 revolutions per minute and a back roll temperature of 165.5° C. at thirty revolutions per minute. The milling was continued for seven minutes after banding of the plastic on the roll.

The plastic formulation was removed from the mill and pressed at 190° C. into 0.3175 cm thick plaques suitable for preparing test specimens.

SAMPLE EVALUATIONS

The plastic compositions prepared in Parts A and B of this Example were evaluated for flame retardancy by the UL-94 Standard for Tests for Flammability of Plastic Materials for Parts in Devices and Appliances (Underwriters Laboratories Inc., second edition as revised February 1975). The UL-94 test procedure is incorporated herein by reference.

The Table displays pertinent data and the UL-94 Flammability Test results for the samples prepared in this Example:

TABLE

| Sample and Base Polymer | Flame Retardant Additive (wt. %) | UL-94 Burn and Other Criteria | | | | UL-94 Rating |
|---|---|---|---|---|---|---|
| | | 10 sec. or less | 11–30 sec. | 31–50 sec. | Total Burn Time (sec.) | |
| Ex. II Part A. - High impact polystyrene | tri-(dibromo-neopentyl) antimonite (13%) | 7 | 3 | 0 | 99 | V-2 |
| Ex. II Part B. - Polypropylene | tri-(dibromo-neopentyl) Antimonite (13%) | 10 | 0 | 0 | — | V-0 |

TEST RESULTS

The tri(dibromoneopentyl) antimonite composition of this invention is an effective flame retardant additive in plastics formulations.

While the invention has been described with certain specific examples and illustrative embodiments, it is not intended to be limited thereby except insofar as appears in the accompanying claims.

What is claimed is:

1. A process for preparing solid tri(dibromoneopentyl) antimonite which comprises contacting in a reaction medium; (1) antimony triester, and (2) dibromoneopentyl glycol; wherein the mole ratio of dibromoneopentylene glycol to antimony triester is about 3 to 2; said contact being at a temperature and for a time effective to transesterify the antimony triester.

2. The process of claim 1 wherein the antimony triester is represented by the formula:

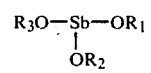

wherein $R_1$, $R_2$, and $R_3$ are independently selected from alkyl radicals having one to twenty carbon atoms.

3. The process of claim 1 wherein the reaction is conducted at a temperature in the range of about 10° C. to 155° C.

4. The process of claim 1 wherein a major portion of the alcohol byproduct of the transesterification reaction is removed during the reaction.

5. The product prepared by the process of claim 1 or 2 or 4.

6. A plastic formulation containing a flame retardant effective amount of the product of claim 5.

7. A formulation according to claim 6 wherein the plastic is selected from the group consisting of polyethylene, polypropylene, and ethylene-propylene copolymers.

8. A formulation according to claim 6 wherein the plastic is a styrenic plastic selected from the group consisting of polystyrene, high impact polystyrene, acrylonitrile-butadiene-styrene resin, and styrene-acrylonitrile resins, polyblends of polystyrene and polyphenylene oxide, and acrylate-styrene-acrylonitrile polymers.

* * * * *